UNITED STATES PATENT OFFICE.

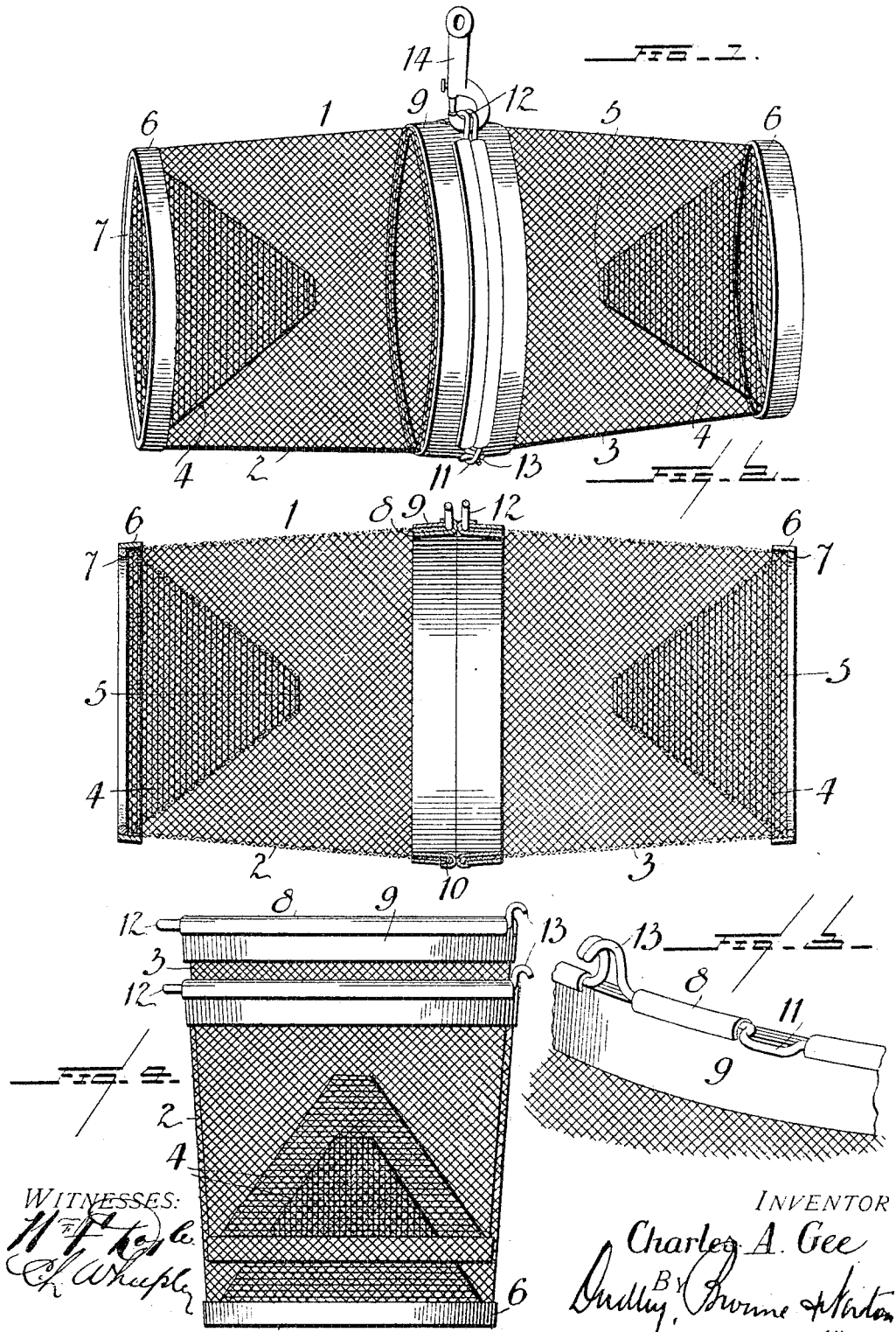

CHARLES A. GEE, OF CUBA, NEW YORK, ASSIGNOR OF ONE-HALF TO MICHAEL C. LOFTIS, OF CUBA, NEW YORK.

FISH-TRAP.

No. 798,670.　　　Specification of Letters Patent.　　　Patented Sept. 5, 1905.

Application filed April 7, 1905. Serial No. 254,289.

*To all whom it may concern:*

Be it known that I, CHARLES A. GEE, a citizen of the United States, residing at Cuba, in the county of Allegany and State of New York, have invented certain new and useful Improvements in Fish-Traps; and I do hereby declare the following to be a full, clear, and exact description of the invention, such as will enable others skilled in the art to which it appertains to make and use the same.

This invention relates to an improved fish-trap designed for catching minnows, crawfish, and the like, the invention having for its object the production of a trap constructed to be durable and to be efficient in operation. Furthermore, by reason of the peculiar construction and assemblage of the parts the trap may be readily and inexpensively manufactured and may be shipped and carried in small compass.

The nature of the invention will be readily comprehended, reference being had to the following detailed description of the construction and operation and to the accompanying drawings, illustrating the trap in its preferred form of embodiment, it being understood that various modifications may be made therein without exceeding the scope of the concluding claims.

In the drawings, Figure 1 is a perspective view of a trap embodying the invention. Fig. 2 is a longitudinal sectional view. Fig. 3 is an enlarged detail view showing the means for hinging the sections together. Fig. 4 shows the sections of the trap in nested relation for transportation.

Referring to the drawings by numerals, 1 designates the trap, which is formed of two similar preferably-tapered casing-sections 2 3, detachably fastened together at their inner ends and each having secured to its outer end to extend inwardly a cone-shaped guide 4, terminating in an inlet-opening 5, through which the fish find their way into the trap. The casing-sections and guides are constructed of reticulated material—for example, woven wire—which is galvanized or otherwise coated or covered to resist the action of the water in which the trap is submerged.

The casing-sections are each strengthened at their outer ends by a galvanized-metal annular band 6, and the guide is secured at its larger end to the section and band and to a galvanized-wire inner ring 7. At the inner end of each section are inner and outer annular bands 8 9, of galvanized metal, to which the material of the section is secured, said band 8 being bent over the band 9 for rigidity and to confine a wire 10, which is offset at opposite points to provide a hinge-eye 11 and a securing-eye 12, the eyes extending through and beyond openings in the bent edge of the inner band 8. The ends of the wire 10 extend through and beyond said bent edge near the eye 11 and are bent to form a hook 13.

Each casing-section is shown to be an exact counterpart of the other, both as to shape and dimensions and as to construction. Any two sections can therefore be assembled, and two or more of the sections may be nested together, as shown in Fig. 4, for convenience in transportation and to minimize space. Two sections are required to make one trap, and said sections may be nested for convenience in carrying to and from the fishing site.

Each casing-section has a hinge-eye, a hook, and a fastening-eye at intervals corresponding to those on another casing. When the larger ends of two sections are brought together, the respective hooks will register with the respective hinge-eyes, and these devices are caused to interengage to hinge the parts together. The fastening-eyes of the assembled sections are in register, and through these eyes is passed the hook portion of a snap-hook 14, to which is attached a cord for suspending the trap. The hinge connection between the sections is such as compels a wide separation of the sections before the latter can be disconnected. Hence in use the trap may be opened to a sufficient extent to remove the fish and bait the trap without danger of disconnection.

I claim as my invention—

1. A fish-trap consisting of two detachable hinged-together similar sections.

2. A fish-trap consisting of two hinged-together reticulated similar sections having conical guides leading to the inlet-openings.

3. A fish-trap consisting of two hinged-together similar sections adapted to be nested one within the other.

4. A fish-trap consisting of two similar sections each having a hook and an eye adapted to engage with the eye and hook on the other, and a fastening-eye opposite to the hook and eye.

5. A fish-trap consisting of two similar sections each having at its inner end a band and a wire confined by the band and bent at intervals to provide a fastening-eye and a hinge element.

In testimony whereof I affix my signature in presence of two witnesses.

CHARLES A. GEE.

Witnesses:
    M. C. LOFTIS,
    P. B. LOFTIS.